United States Patent
Kossow (10) Patent No.: US 10,831,951 B1
(45) Date of Patent: Nov. 10, 2020

(54) GENERATION AND USE OF SIMULATION PROFILES TO PRESERVE COMPUTING RESOURCES

(71) Applicant: UNITED SERVICES AUTOMOBILE ASSOCIATION (USAA), San Antonio, TX (US)

(72) Inventor: Kevin Anthony Kossow, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 350 days.

(21) Appl. No.: 15/901,331

(22) Filed: Feb. 21, 2018

Related U.S. Application Data (60) Provisional application No. 62/471,775, filed on Mar. 15, 2017.

(51) Int. Cl.
| | |
|---|---|
| *G06Q 10/10* | (2012.01) |
| *G06F 30/20* | (2020.01) |
| *G06F 17/18* | (2006.01) |
| *G06F 111/10* | (2020.01) |

(52) U.S. Cl.
CPC .............. *G06F 30/20* (2020.01); *G06F 17/18* (2013.01); *G06F 2111/10* (2020.01)

(58) Field of Classification Search
CPC ........ G06Q 40/06; G06Q 10/10; G06Q 30/02; G06Q 10/06; G06Q 10/0635; G06Q 40/00; G06Q 40/04; G06K 9/6219; G06F 30/20; G06F 17/18; G06F 2111/10
See application file for complete search history.

(56) References Cited

U.S. PATENT DOCUMENTS

| | | | | |
|---|---|---|---|---|
| 7,031,935 | B1* | 4/2006 | Chhabra | G06Q 40/00 |
| | | | | 705/36 T |
| 7,451,065 | B2* | 11/2008 | Pednault | G06K 9/6219 |
| | | | | 703/2 |
| 8,341,063 | B1* | 12/2012 | Cernyar | G06Q 40/06 |
| | | | | 705/35 |
| 8,719,139 | B1* | 5/2014 | Smyk | G06Q 40/06 |
| | | | | 705/36 R |
| 9,454,739 | B2* | 9/2016 | Meade | G06Q 10/06 |
| 10,115,162 | B1* | 10/2018 | Karlsson | G06F 30/20 |
| 2006/0111931 | A1* | 5/2006 | Johnson | G06Q 10/10 |
| | | | | 705/7.11 |
| 2008/0288312 | A1* | 11/2008 | Miles | G06Q 30/02 |
| | | | | 705/7.34 |

(Continued)

*Primary Examiner* — Kandasamy Thangavelu
(74) *Attorney, Agent, or Firm* — Fletcher Yoder P.C.

(57) ABSTRACT

Methods, systems, and apparatus, including computer programs encoded on computer storage media, to generate and use a simulation profile are described. One of the methods includes performing a plurality of simulations over a plurality of interval, each simulation generating a value for each interval, each simulation using the same inputs. The method includes for each interval, sorting the values corresponding to that interval. The method includes identifying a median value for each interval. The method includes identifying values for each of a plurality of thresholds for each interval. The method includes calculating a ratio between each of the identified values and the median value. The method includes generating a profile using the median values and the calculated ratios.

15 Claims, 5 Drawing Sheets

(56) References Cited

U.S. PATENT DOCUMENTS

| | | | | |
|---|---|---|---|---|
| 2010/0030699 A1* | 2/2010 | Caputo | ................. | G06Q 40/04 |
| | | | | 705/36 R |
| 2015/0278957 A1* | 10/2015 | Wiwi | ..................... | G06Q 40/06 |
| | | | | 705/36 T |
| 2016/0110812 A1* | 4/2016 | Mun | ..................... | G06Q 40/06 |
| | | | | 705/36 R |
| 2017/0323274 A1* | 11/2017 | Johnson | ............. | G06Q 10/0635 |

* cited by examiner

FIG. 1

| Scenario Year | 2016 | 2017 | 2018 | 2019 | 2020 | 2021 | 2022 | 2023 |
|---|---|---|---|---|---|---|---|---|
| 1 | 8904.39 | 8660.41 | 8360.49 | 8256.27 | 8129.96 | 8262.87 | 8413.51 | 8971.59 |
| 2 | 9058.17 | 8778.84 | 9165.78 | 8842.56 | 9439.72 | 9515.13 | 9296.66 | 10306.1 |
| 3 | 9264.11 | 9195.49 | 9178.7 | 9437.57 | 9594.32 | 9950.51 | 10344.5 | 10308.8 |
| 4 | 9299.58 | 9358.03 | 9255.75 | 9662.91 | 10099.2 | 9990.88 | 10345.9 | 10655.1 |
| 5 | 9390.6 | 9419.59 | 9316.79 | 9874.2 | 10161.5 | 10204.9 | 10510.4 | 10842.9 |
| 6 | 9395.43 | 9472.44 | 9556.64 | 10000.4 | 10265.4 | 10247.6 | 10653.3 | 10919.6 |
| 7 | 9408.87 | 9513.91 | 9578.77 | 10001.7 | 10327 | 10453.8 | 10792.9 | 11079.4 |
| 8 | 9434.88 | 9539.08 | 9681.92 | 10106.5 | 10365.5 | 10486.2 | 10874 | 11087.6 |
| 9 | 9439.22 | 9549.63 | 9818.64 | 10187.5 | 10408.9 | 10521.9 | 10881.2 | 11175.2 |
| 10 | 9442.43 | 9591.67 | 9863.41 | 10261.5 | 10440.7 | 10634.8 | 11006.5 | 11182.7 |
| 11 | 9489.23 | 9605.69 | 9993.69 | 10262.4 | 10459.8 | 10748.9 | 11012.7 | 11238.5 |
| CAGR | 1.02 | | | | | | | |
| Confidence Band Ratios | | | | | | | | |
| Low | 0.96 | 0.93 | 0.96 | 0.88 | 0.92 | 0.93 | 0.87 | 0.94 |
| High | 1.01 | 1.01 | 1.03 | 1.03 | 1.02 | 1.04 | 1.03 | 1.02 |

GENERATION AND USE OF SIMULATION PROFILES TO PRESERVE COMPUTING RESOURCES

CROSS-REFERENCE TO RELATED APPLICATION

This application claims priority to U.S. Application Ser. No. 62/471,775, filed on Mar. 15, 2017, the entirety of which is incorporated by reference into the present disclosure.

BACKGROUND

Monte Carlo simulations refers to a class of computational algorithms that rely on repeated random sampling to obtain numerical results. The simulation uses randomness to solve problems that might be deterministic in principle. They are often used in physical and mathematical problems and are most useful when it is difficult or impossible to use other approaches. Monte Carlo methods can be used to generate drawings from a probability distribution. By the law of large numbers, integrals described by the expected value of some random variable can be approximated. Performing Monte Carlo simulations require a large amount of computational resources and can take a considerable amount of time.

SUMMARY

This specification describes technologies relating to complex simulations of probabilistic events.

In general, one innovative aspect of the subject matter described in this specification can be embodied in methods that include the act of performing a plurality of simulations over a plurality of interval, each simulation generating a value for each interval, each simulation using the same inputs. The methods include the act of for each interval, sorting the values corresponding to that interval. The methods include the act of identifying a median value for each interval. The methods include the act of identifying values for each of a plurality of thresholds for each interval. The methods include the act of calculating a ratio between each of the identified values and the median value. The methods also include the acts of generating a profile using the median values and the calculated ratios.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The plurality of simulations are Monte Carlo simulations. The methods may include the acts of receiving new inputs, and applying the profile to the input inputs to determine outputs consistent with performing a second plurality of simulations using the new inputs. The methods may include the acts of reporting the outputs, wherein the outputs include at least one of an expected value, and values that define a ninety percent confidence band. The inputs may include at least one of a starting value and an incremental value added during each interval.

Particular embodiments of the subject matter described in this specification can be implemented so as to realize one or more of the following advantages. Within an acceptable margin of error, the effects of performing a simulation, using different inputs, can be determined without requiring the simulation to be performed. Computing resources can be used more efficiently. Near real time information can be displayed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Monte Carlo simulation refers to a class of computational algorithms that rely on repeated random sampling to obtain numerical results. The simulation uses randomness to solve problems that might be deterministic in principle. They are often used in physical and mathematical problems and are most useful when it is difficult or impossible to use other approaches. Monte Carlo methods can be used to generate drawings from a probability distribution. By the law of large numbers, integrals described by the expected value of one or more random variables can be approximated by taking the empirical mean. When the probability distribution of the variable is parametrized, Markov Chain Monte Carlo samplers can be used to approximated by the empirical measures of the random states.

One example of a Monte Carlo simulation is a Markov chain Monte Carlo (MCMC). A Markov chain Monte Carlo simulation uses sampling from a probability distribution based on constructing a Markov chain that has the desired distribution of its equilibrium distribution. The state of the chain after a number of steps is then used as a sample of the desired distribution. The quality of the sample improves as a function of the number of steps.

One area where Monte Carlo simulations are particularly useful is in the prediction of potential future value for financial investments under different sets of assumptions. With a balanced portfolio, modern portfolio theory is used to choose assets that will offset one another and minimize the risk of the portfolio while maximizing the return.

While markets are not 100% predictable, the performance of an investment profile can be predicted using Monte Carlo simulations. At the same time, financial planning can include many different variables. How should the money be invested? How much should be invested? When should the money be invested? One of the drawbacks to Monte Carlo simulations is that running a simulation is time consuming and CPU intensive. As such, it is not practical to run a Monte Carlo simulation for each change made to an investment plan.

At the same time, projecting the future value of an investment needs to be suitably precise so as not to mislead a potential investor. A computer system can use Monte Carlo simulations to establish a baseline profile that can be expanded to account for variations in an investment plan specified by a user.

A system can derive the performance characteristics of a portfolio using a Monte Carlo simulation and later apply those characteristics to a specific plan to produce an expected future value graph even when the initial investment, periodic investment amounts, and duration of the investment change For example, there may be a limited number of portfolios (or portfolio models) that each represent different levels of risk (for example, 6). Using derived characteristics of the portfolio, a system can render an expected future value graph for any user with any initial amount, time frame, and/or monthly contribution.

This is applicable because the Monte Carlo is used to determine generic portfolio characteristics for a given portfolio model that apply regardless of the amount invested. A portfolio that returns 6% on average will return 6% on average regardless of when the money is invested. The graph will obviously have to accumulate the assets according to when they are invested, but the rate of return and volatility will be determined by the model, not by the amount of money or the timeframe.

A system can extract the portfolio information (such as return rates and volatility) so that it can reproduce an expected future value graph given any other values, and do so in an efficient manner.

Figure 1:
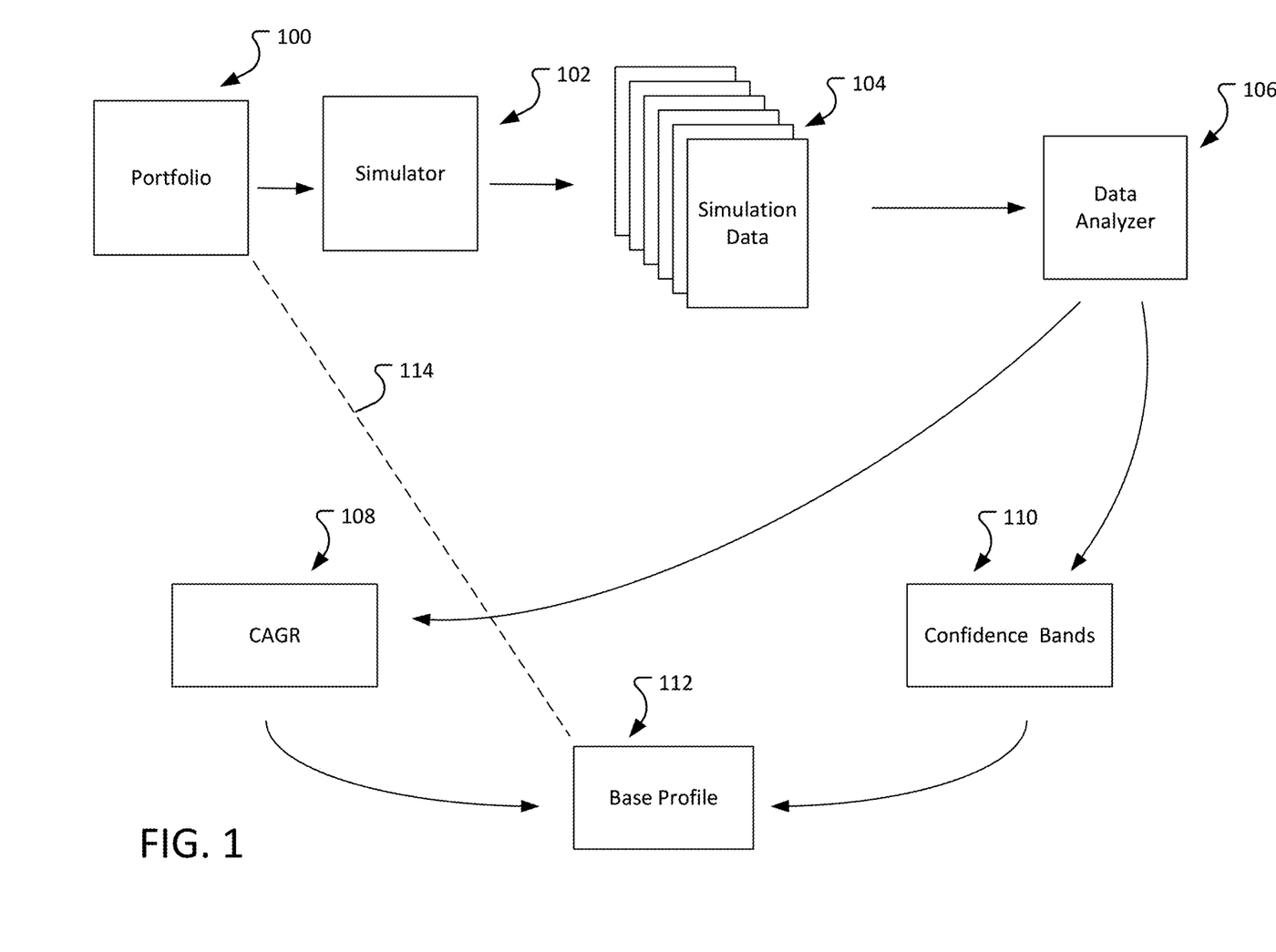
FIG. 1 illustrates an example environment for establishing a baseline profile.

FIG. 1 illustrates an example environment for establishing a baseline profile. A portfolio 100 includes information that can be described as parameters useable in a Monte Carlo simulation. While the example in FIG. 1 is described as using the Monte Carlo simulation to perform an analysis on an investment portfolio having a predefined risk/reward profile, the systems and processes described herein can be used to generate simulation profiles for a wide variety of different types of data analysis using different kinds of simulation techniques.

A simulator 102 performs Monte Carlo simulators based on some criteria. For example, the simulator may perform a series of Monte Carlo simulations on the financial performance of a predefined portfolio. In some implementations, the portfolio may be defined based on a risk/reward balance (for example, aggressive growth). In order to provide for more accurate results, a particular simulation on a portfolio may be perform for a period of years (for example, 10, 20, 30, 50, 100 years). The simulation may also be performed multiple times (for example, 10, 100, 1000, etc.). This provides a range of values for each year over the simulation period. Each simulation can produce simulation data 104. Generally, the more times a simulation is run the more accurate the results.

A data analyzer 106 accepts the simulation data 104 (for example, the data may be stored in a data base or in flat files). The data analyzer 106 identifies a compound aggregate growth rate and percentile bands based on the simulation data. The compound aggregate growth rate and percentile band data can be combined into a profile. In some implementations, the compound aggregate growth rate and the percentile band data are the profile.

In some implementations, the data analyzer 106 takes all of the simulation data for a first interval (for example, the first year) and sorts it. The data analyzer 106 may then sort the data for the second year, and the third year, and so on through the period of the simulation.

The data analyzer 106 may take the median value for each simulation interval (in this example, the year). The data from the median value from each year is determined to the be 50 percent values. Note, because each interval is sorted independently, values in the set of 50 percent values may be taken from different simulation data and consequently different simulations.

The compound aggregate growth rate (CAGR) can be derived from the 50th percentile aggregated asset balance in the final year of the Monte Carlo simulation data. It is a single number that represents the return of the portfolio that when compounded will give the median asset value for that portfolio.

The CAGR is different from the average annual yield and is a slightly lower value. The reason that this is true is somewhat non-intuitive and bears explanation.

The best way to explain the difference is by using an example.

If one invested $10,000 and received a return in the first year of 100%, and a loss of 50% in the second, they would have a balance of $20,000 after the first year and a balance of $10,000 after the second. The average annual yield would be 100%+−50%/2=25%. The total yield and compound annual growth rate in this case, however, is 0, because the ending balance is exactly the same as the starting balance.

While there are ways to approximate compound annual growth rate using average return and standard deviation, the most accurate way to determine it is to run multiple simulations and then derive the annual growth rate from the ending balances.

The system uses the 50th percentile or median value, because that is the value that most accurately represents the expected return. Half of the results will fall above that value, and half of the results will fall below that value.

Once the median balance is determined, the formula for calculating CAGR is $$CAGR=(EndingBal/BeginningBal)^{(1/\#years)}-1$$

The beginning balance is provided as an input for the Monte Carlo. The correct ending balance is retrieved by sorting the last column of data and choosing the 250th simulation result (given 500 simulations).

Once known, the CAGR can be used to calculate the expected value of a given portfolio for each year for any given initial investment with any additional contribution. The asset value is a simple calculation of the previous year's asset value plus compounded interest, plus incremental contributions, plus interest on incremental contributions. The curve that it will yield is a simple compound interest curve that represents the median return.

The data analyzer 106 can determine confidence bands 110 based on the simulation data 104. For example, the system can determine a 90% confidence band by selecting the appropriate high and low values from sorted simulation data for each year. For example, for a simulation that is performed 1000 times, the 90% confidence bands can be determined by selecting the $50^{th}$ ordered result (50 out of 1000) and the $950^{th}$ ordered results result (950 out of 1000) for each year. Similarly, using the same example, an 80% confidence band can be determined by selecting the 100th and 900th values from the sorted data, for each year.

Put another way, an 90% confidence band would define the region that represents the asset balance for 90% of the trials (around the median).

The confidence band values are directly related to the volatility of the portfolio. The more volatile the portfolio, the wider the range of results. The more stable the portfolio, the narrower the range of results.

The values can be converted into a ratio that compares the high/low value in the band to the median value. For example, if the media value is 50 in year, and the high value of the 95% band is 100 in year 5, then the ratio for the high value of the 95% band is 2:1, or twice the median value. By converting each high and low value into a ratio, the bands are converted from fixed values to relative values that can be applied to a wide variety of different situations.

As such, the 90% confidence band can be determined by selecting by selecting 90% of the simulation values excluding the same number of values above and below the selected range and identifying the high and low values within the selecting values.

In some implementations, the system may calculate a 80% and 95% confidence band to store in the profile.

The percentile bands 110 and the CAGR 108 are combined into a base profile for the portfolio 100 (as illustrated by the dotted line 114). The base profile cam be used in place of a full Monte Carlo simulation. In some implementations, the base profile can be used in place of the full Monte Carlo simulation for variations in a subset of variables. For example, the base profile may be able to account for changes in investment amounts and timing but unable to account for changes in the risk free rate of return. When parameters for which the profile cannot account occur a new set of simulations should be performed and a new baseline profile be established.

In some implementations, establishing a new baseline profile may happen automatically in response to a change in the assumptions. For example, a system (not shown) may monitor ongoing financial information and may determine that a parameter has exceeded a threshold range, triggering a new set of simulations. Alternatively, manually updating or changing the assumptions associated with the base portfolio may cause the portfolio to be re-simulated. In some implementations, the system may run 500 simulations that span a total of 30 years.

Figure 2:
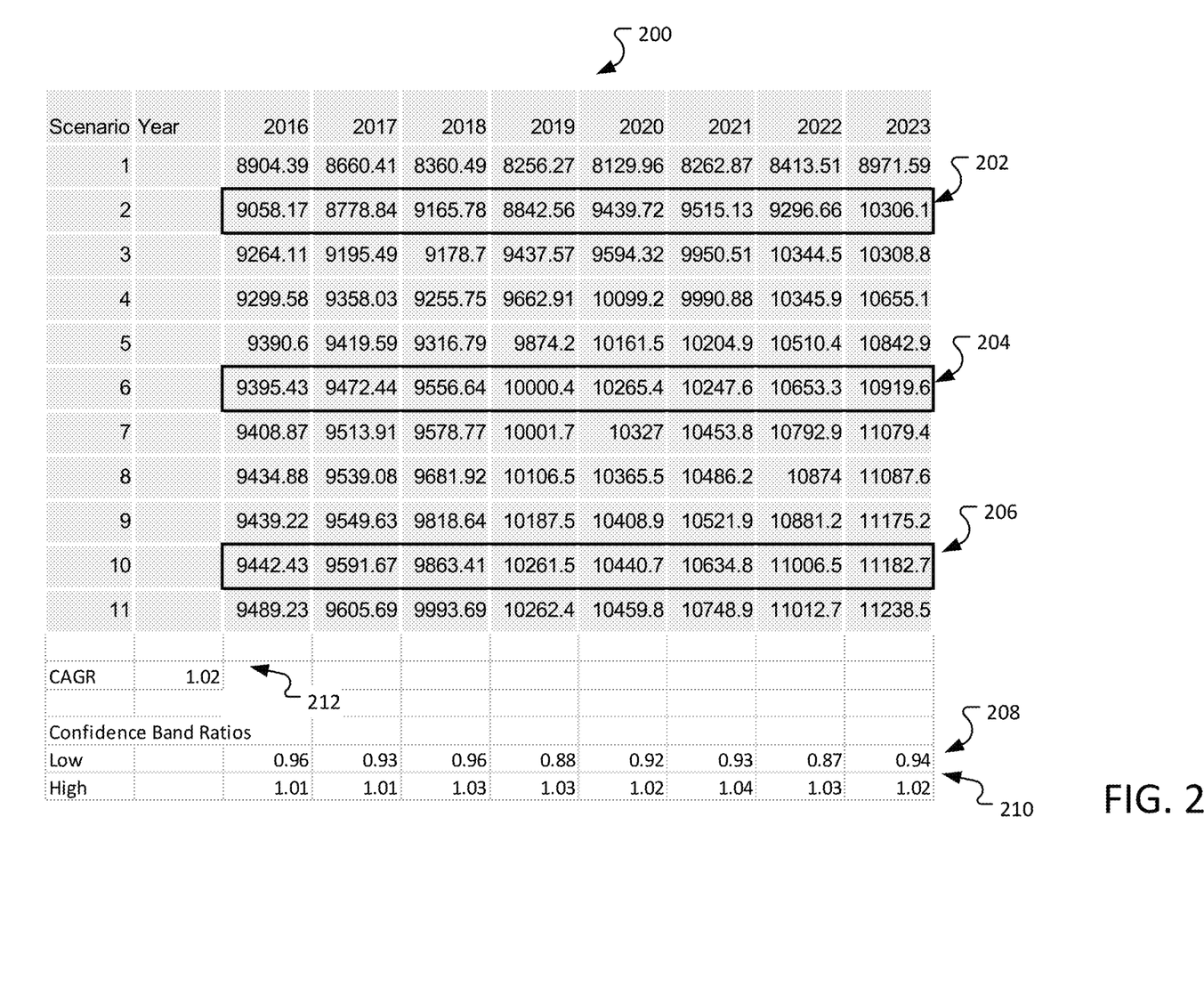
FIG. 2 is a table that illustrates a simplified determination confidence bands.

FIG. 2 is a table 200 that illustrates a simplified determination confidence bands. The table 200 includes columns that represent years and rows that represent simulated balances corresponding to particular years. Each column is independently sorted from lowest to highest.

In this example, a low value for the confidence band is selected from the row 202. The high value for the confidence band is selected from the row 206. And the median value is selected from the row 204.

Row 208 illustrates the ratio between the low value of the confidence band and the median value. Row 210 illustrates the ratio between the high value of the confidence band and the median value.

The growth value 212 identifies the compound aggregate growth rate determined using the data from the median value row 204.

Figure 3:
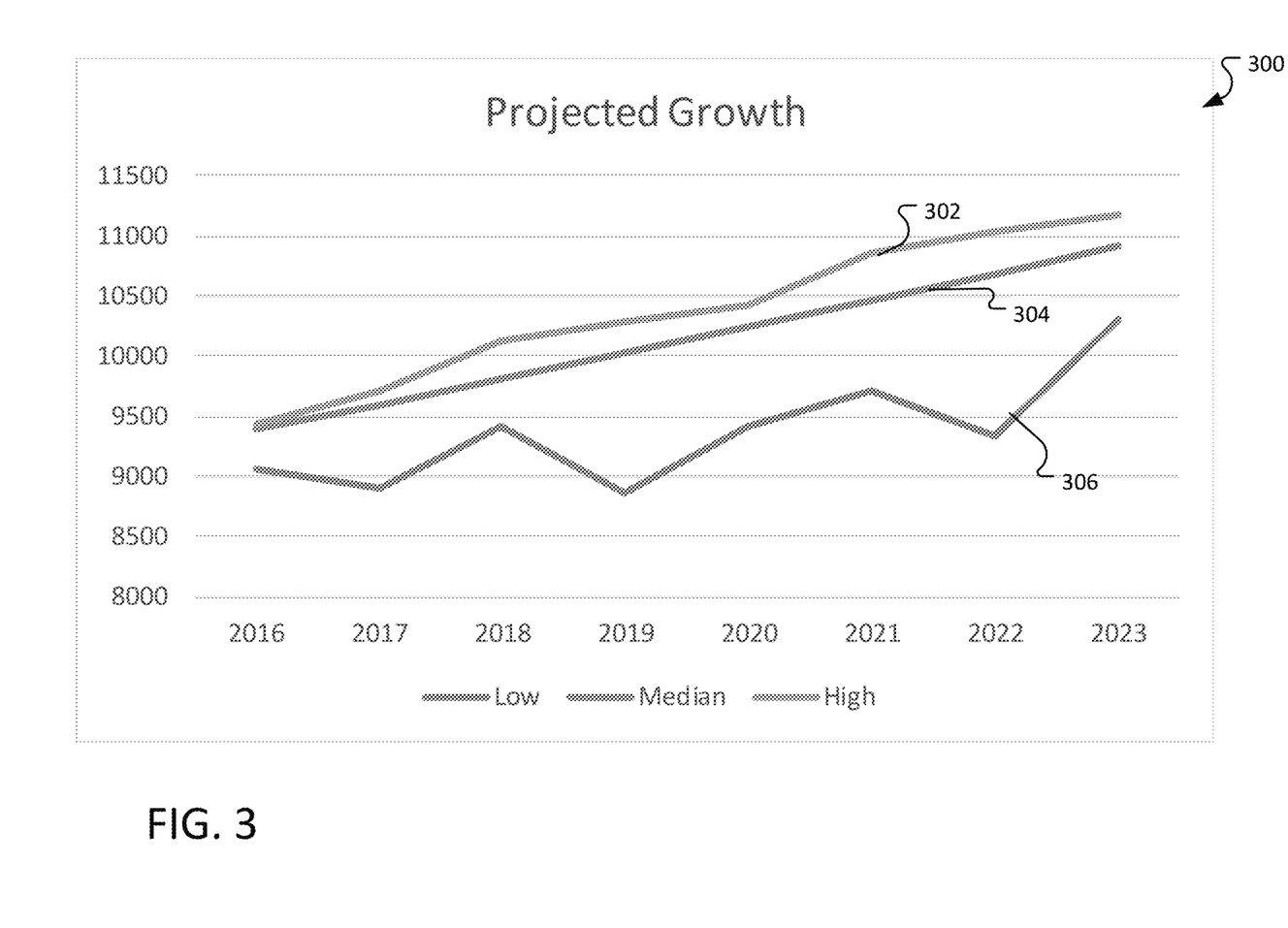
FIG. 3 illustrates a chart of the data in FIG. 2.

FIG. 3 illustrates a chart 300 of the data in FIG. 2. The chart 300 includes three lines, the high value of the confidence band 302, the median value 304 and the low value of the confidence band 306. It should be understood that the jagged lines for the high confidence band 302 and the low confidence band 306 are due to the relatively small set of data used in FIG. 2. When a full simulation is executed the large number of data elements tend to smooth the high and low confidence band to better reflect the example presented in FIG. 4. However, for illustration and clarity purposes, its useful to illustrate the process using a small sample set.

Figure 4:
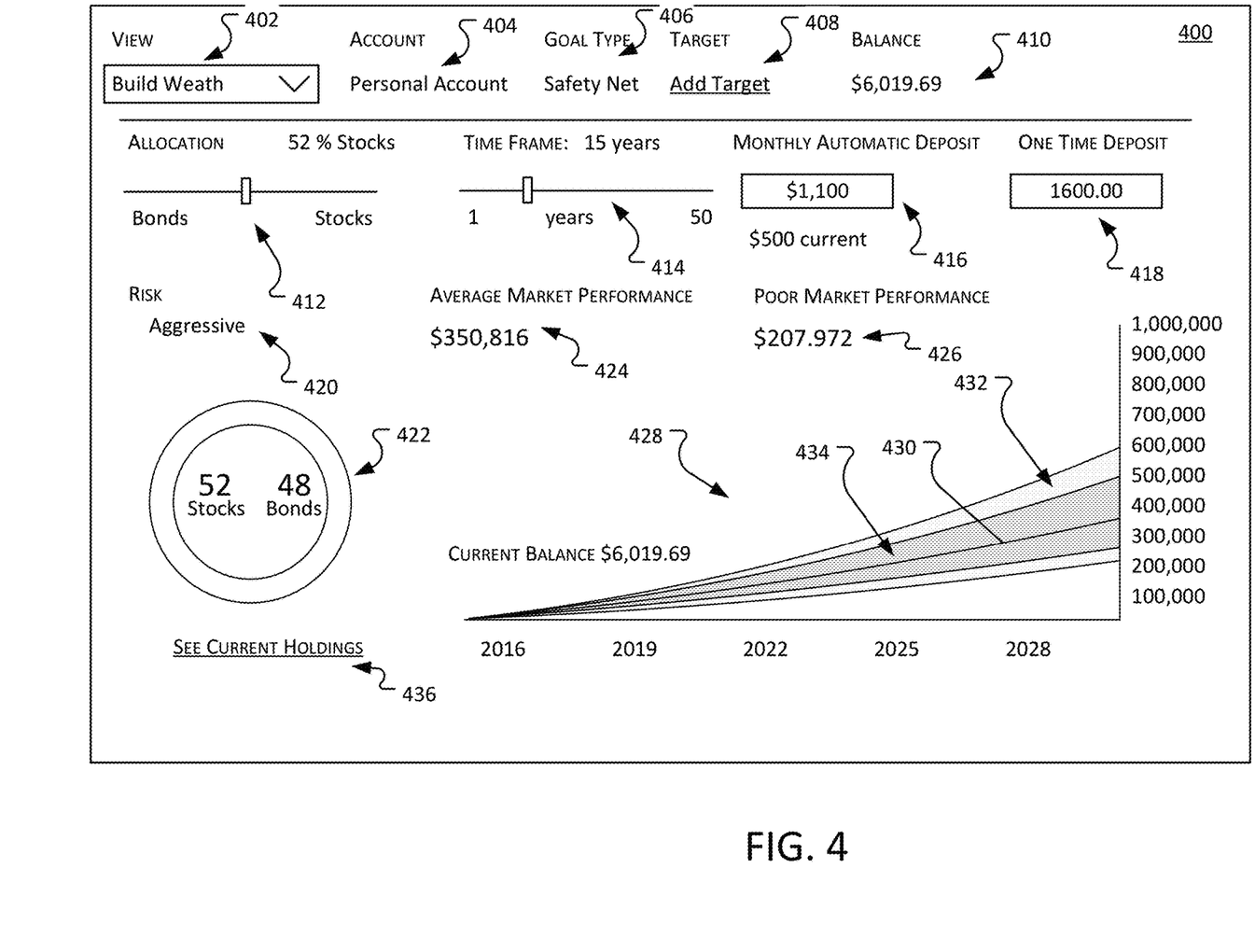
FIG. 4 is an example of a user interface that enables a user to modify investment characteristics and view the results using a base profile.

FIG. 4 is an example of a user interface 400 that enables a user to modify investment characteristics and view the results using a base profile. The user interface 400 may include a view selector 402, where the user may select between different views. The user interface 400 may include an account description 404 which displays the account the user is viewing. The user interface may display a goal type 406, the goal type may specify the goals of the user, for example, to save sufficient funds to serve as a safety net in case of temporary loss.

The user interface 400 may enable the user to add a particular target 408. A target may be, for example, an amount of money that the user would like to save. The user interface 400 displays the current balance 410 in the account 404.

The user interface 400 may enable the user to select the asset allocation between stocks and bonds 412. Changing the asset allocation between stocks and bond (or other investments) may be performed by moving a slider. In some implementations, the user may be switching asset allocations between different risk profiles, which is reflected by the risk display 420. For example, there may be 6 or 7 different risk profiles. Each risk profile may correspond to a different base profile, as described above.

An infographic icon 422 may display the allocation between stocks and bonds. Additionally, the user may be able to view the user's current holdings by selecting a link 436.

The user interface 400 may enable the user to select a number of years 414 to view. The user may also be able to specify an automatic monthly deposit amount 416 and/or a onetime deposit amount 418.

The user interface 400, or a processor driving the user interface 400, uses the base simulation profile corresponding to the selected risk profile, and using that generates the expected market performance of the user's investments. In this example, the user interface 400 displays the average market performance 424 and the poor market performance 426. These market performances may be based on the profile, the current balance, the monthly automatic deposits, and the one-time deposit.

The user interface 400 may display a graph 428 displaying the expected performance of the investments using the base profile. The median line 430 may correspond to the median line described above, but adjusted to reflect the starting balance, automatic deposits, and one-time deposit. The graph may also display lines based on the confidence bands. For example, the inner area 434 may be determined by multiplying the expected balance on the date in question by the ratios for the 80% confidence interval stored in the base profile. The outer area may be determined by a 95% confidence interval stored in the base profile.

In some implementations, the user interface 400 may display a percentage change that the user will meet their target (defined by the add target area 408) based on their investment strategy.

Figure 5:
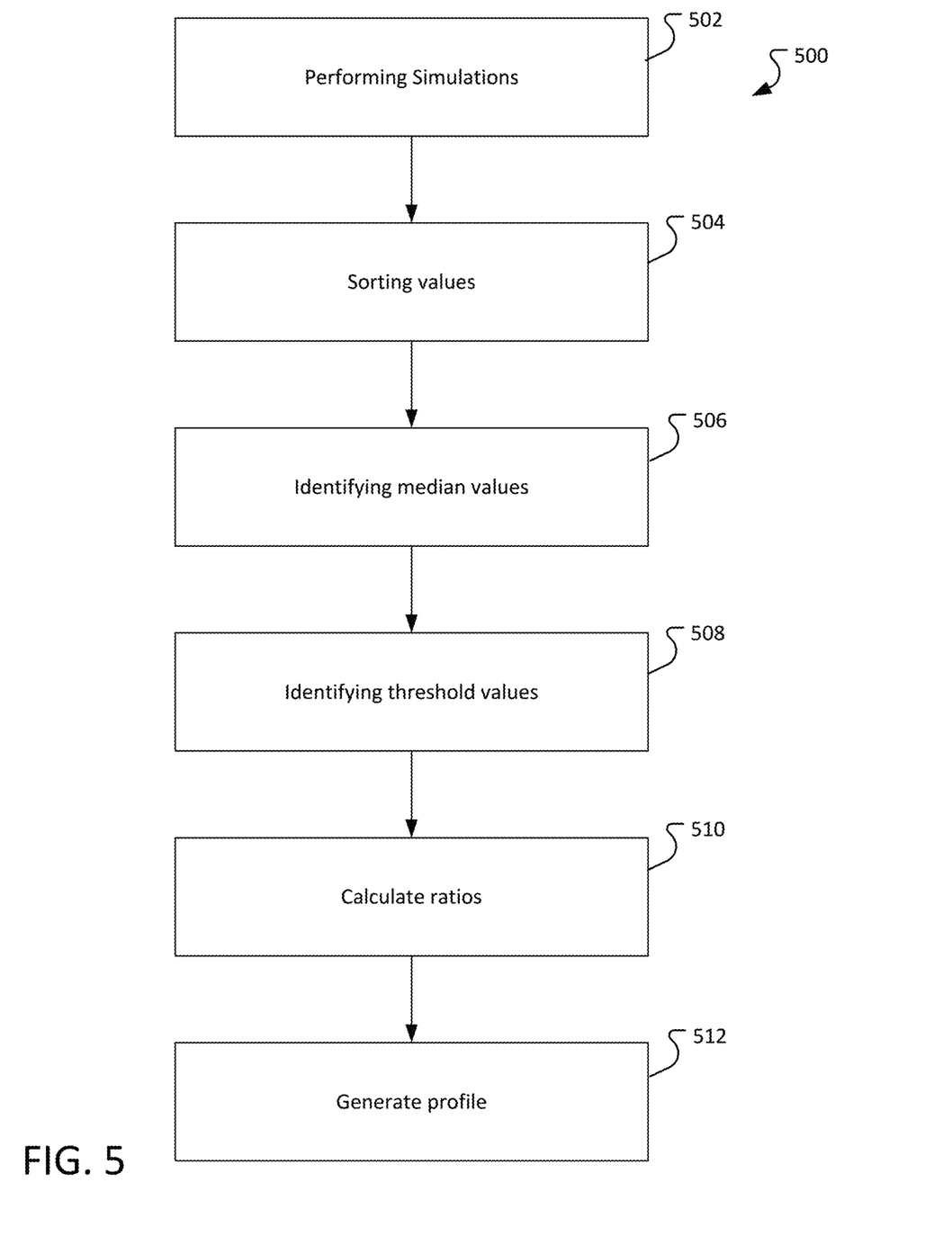
FIG. 5 is a flowchart of an exemplary process for generating a profile.

FIG. 5 is a flowchart of an exemplary process 500 for generating a profile. The profile may be used to determine the effects of a simulation on a new set of values, as discussed further below.

The process 500 performs 502 performs multiple simulations (for example, 1000 simulations). Each simulation may computer values over multiple intervals (for example, years). For example, the process 500 may execute a Monte Carlo simulation on a given set of inputs multiple times to generate a set of output data that describes the probably set of outputs from the simulation.

The process 500 sorts 504 the output values. The output values for each interval can be sorted independently of other intervals. For example, the lowest value in the first interval may have been generated by the $60^{th}$ simulation, while the lowest value in the second interval may have been generate by the $75^{th}$.

The process 500 identifies 506 a median value for each interval. The median value can serve as a base line, or the 50% line.

The process 500 identifies 508 threshold values. For example, the process 500 may identify the values for each interval that makes up a 90% confidence interval (for example, for 1000 simulations, the 90% confidence interval may be determined using the $50^{th}$ and the $950^{th}$ values in each interval).

The process 500 calculates 510 a ratio for the confidence intervals. For example, the process 500 may divide the value identified as representative of the confidence interval by the median value.

The process 500 generates 512 a profile using the median values and the calculated ratios. The profile may include, for example, a growth rate based on the median values and the interval ratios.

The resulting profile can be used with different inputs to calculate an probable distribute of values that a simulation would have produced had the simulation been performed, but without requiring the CPU cycles and processing resources that would have been otherwise required to perform the simulations using the new inputs.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor)

for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for performing an analysis of a financial portfolio comprising:
    performing a plurality of simulations associated with the financial portfolio over a plurality of interval times, each simulation generating a plurality of values for a plurality of financial performances for a respective interval of time, each simulation using a same set of inputs for generating the plurality of values;
    for each interval of time, collecting a portion of the plurality of values corresponding to a respective interval of time;
    identifying a median value for the portion of the plurality of values for each interval of time;
    determining a compound aggregate growth rate based on the median value for the portion of the plurality of values for each interval of time;
    identifying a confidence band based on two values selected at each end of the band to contain an equal number of values between the median value and the selected value on either side for the portion of the plurality of values for each interval of time;
    calculating a ratio between one of the two values and the median value for the portion of the plurality of values for each interval of time; and
    generating a profile using the determined compound aggregate growth rate, the median value and the calculated ratio for each interval of time.

2. The computer implemented method of claim 1, wherein the plurality of simulations comprises a plurality of Monte Carlo simulations.

3. The computer implemented method of claim 2, further comprising:
    executing the plurality of Monte Carlo simulations on the same set of inputs multiple times to generate a set of output data corresponding to each Monte Carlo simulation of the plurality of Monte Carlo simulations; and
    determining a probable set of outputs from each Monte Carlo simulation of the plurality of Monte Carlo simulations.

4. The computer implemented method of claim 1, further comprising:
    receiving a set of new inputs; and
    applying the generated profile to the new inputs to compute values of outputs without performing additional simulations;
    determining whether any of the computed values of outputs is outside a threshold range;
    in response to any new value being outside the threshold range, performing a plurality of additional simulations associated with the financial portfolio over a plurality of interval times using the set of new inputs for generating the plurality of values; and updating the profile using the results from the additional simulations.

5. The computer implemented method of claim 1, wherein the same set of inputs includes at least one of a starting value and an incremental value added during each respective interval of time.

6. A non-transitory computer storage medium encoded with computer program instructions that when executed by one or more computers cause the one or more computers to perform operations for performing an analysis of a financial portfolio comprising:

performing a plurality of simulations associated with the financial portfolio over a plurality of interval times, each simulation generating a plurality of values for a plurality of financial performances for a respective interval of time, each simulation using a same set of inputs for generating the plurality of values;

for each interval of time, collecting a portion of the plurality of values corresponding to a respective interval of time;

identifying a median value for the portion of the plurality of values for each interval of time;

determining a compound aggregate growth rate based on the median value for the portion of the plurality of values for each interval of time;

identifying a confidence band based on two values selected at each end of the band to contain an equal number of values between the median value and the selected value on either side for the portion of the plurality of values for each interval of time;

calculating a ratio between one of the two values and the median value for the portion of the plurality of values for each interval of time; and generating a profile using the determined compound aggregate growth rate, the median value and the calculated ratio for each interval of time.

7. The non-transitory computer storage medium of claim 6, wherein the plurality of simulations comprises a plurality of Monte Carlo simulations.

8. The non-transitory computer storage medium of claim 7, wherein the computer program instructions that when executed by one or more computers cause the one or more computers to perform the further comprising:

executing the plurality of Monte Carlo simulations on the same set of inputs multiple times to generate a set of output data corresponding to each Monte Carlo simulation of the plurality of Monte Carlo simulations; and determining a probable set of outputs from each Monte Carlo simulation of the plurality of Monte Carlo simulations.

9. The non-transitory computer storage medium of claim 6, further comprising:

receiving a set of new inputs; and applying the generated profile to the new inputs to compute values of outputs without performing additional simulations;

determining whether any of the computed values of outputs is outside a threshold range;

in response to any new value being outside the threshold range, performing a plurality of additional simulations associated with the financial portfolio over a plurality of interval times using the set of new inputs for generating the plurality of values; and updating the profile using the results from the additional simulations.

10. The non-transitory computer storage medium of claim 6, wherein the same set of inputs includes at least one of a starting value and an incremental value added during each respective interval of time.

11. A system comprising:

one or more computers and one or more storage devices storing instructions that are operable, when executed by the one or more computers, to cause the one or more computers to perform operations for performing an analysis of a financial portfolio comprising:

performing a plurality of simulations associated with the financial portfolio over a plurality of interval times, each simulation generating a plurality of values for a plurality of financial performances for a respective interval of time, each simulation using a same set of inputs for generating the plurality of values;

for each interval of time, collecting a portion of the plurality of values corresponding to a respective interval of time;

identifying a median value for the portion of the plurality of values for each interval of time;

determining a compound aggregate growth rate based on the median value for the portion of the plurality of values for each interval of time;

identifying a confidence band based on two values selected at each end of the band to contain an equal number of values between the median value and the selected value on either side for the portion of the plurality of values for each interval of time;

calculating a ratio between one of the two values and the median value for the portion of the plurality of values for each interval of time; and generating a profile using the determined compound aggregate growth rate, the median value and the calculated ratio for each interval of time.

12. The system of claim 11, wherein the plurality of simulations comprises a plurality of Monte Carlo simulations.

13. The system of claim 12, further comprising:

executing the plurality of Monte Carlo simulations on the same set of inputs multiple times to generate a set of output data corresponding to each Monte Carlo simulation of the plurality of Monte Carlo simulations; and determining a probable set of outputs from each Monte Carlo simulation of the plurality of Monte Carlo simulations.

14. The system of claim 11, further comprising:

receiving a set of new inputs; and applying the generated profile to the new inputs to compute values of outputs without performing additional simulations;

determining whether any of the computed values of outputs is outside a threshold range;

in response to any new value being outside the threshold range, performing a plurality of additional simulations associated with the financial portfolio over a plurality of interval times using the set of new inputs for generating the plurality of values; and updating the profile using the results from the additional simulations.

15. The system of claim 11, wherein the same set of inputs includes at least one of a starting value and an incremental value added during each respective interval of time.

* * * * *